(12) United States Patent
Chubb (10) Patent No.: US 8,006,984 B2
(45) Date of Patent: Aug. 30, 2011

(54) STACKABLE DOLLY

(75) Inventor: Richard A. Chubb, Voorhees, NJ (US)

(73) Assignee: Thermoseal Glass Corp, LLC, Gloucester City, NJ (US)

(*) Notice: Subject to any disclaimer, the term of this patent is extended or adjusted under 35 U.S.C. 154(b) by 1698 days.

(21) Appl. No.: 10/972,565

(22) Filed: Oct. 25, 2004

(65) Prior Publication Data

US 2006/0087092 A1    Apr. 27, 2006

(51) Int. Cl.
*B62B 5/00* (2006.01)
(52) U.S. Cl. ............... 280/33.998; 280/79.11; 280/79.3
(58) Field of Classification Search ................. 180/53.1, 180/53.3, 53.5; 280/33.991, 33.994, 33.998, 280/79.11, 79.3; 108/53.1, 53.3, 53.5
See application file for complete search history.

(56) References Cited

U.S. PATENT DOCUMENTS

| | | | | | |
|---|---|---|---|---|---|
| 2,747,692 | A | * | 5/1956 | Holmes | 188/5 |
| 2,827,302 | A | * | 3/1958 | Skyrud | 280/33.998 |
| 3,689,098 | A | * | 9/1972 | Rubin | 280/33.998 |
| 4,706,573 | A | * | 11/1987 | Sielaff | 108/190 |
| 4,863,179 | A | * | 9/1989 | Isaacs | 280/33.996 |
| 5,411,360 | A | * | 5/1995 | Hilliker et al. | 414/608 |
| 6,273,006 | B1 | * | 8/2001 | Reutter et al. | 108/53.1 |
| 6,793,223 | B2 | * | 9/2004 | Ondrasik et al. | 280/47.35 |

* cited by examiner

Primary Examiner — J. Allen Shriver, II
Assistant Examiner — Katy Meyer
(74) Attorney, Agent, or Firm — Francis C. Hand; Carella, Byrne, Cecchi (57) ABSTRACT

The dolly is constructed with wheels to provide mobility and with posts to allow for stacking of one dolly on another for storage purposes and return shipment purposes. A long dolly may also be provided with laterally mounted posts for receiving and supporting a shorter, but wider, dolly thereon. Each corner post is provided with a dependent pin that is able to fit into an opening in the upper end of a post of a dolly below. Removable support feet are provided for supporting a loaded dolly for transport with the wheels in an elevated position.

18 Claims, 8 Drawing Sheets

STACKABLE DOLLY

This invention relates to a stackable dolly. More particularly, this invention relates to a stackable dolly for shipping racks for glass sheets and the like.

As is known, reusable shipping racks of various types have been employed for transporting sheets of flat glass and other like articles. Examples of such shipping racks are described in U.S. Pat. No. 4,934,538. Typically, the racks are of a robust construction in order to support a heavy load of flat glass sheets. Further, the racks have been constructed so as to be moved from place to place by forklift trucks and the like.

One disadvantage of the known racks is that the racks have a limited capacity in terms of the length of a glass sheet that may be transported. Another disadvantage is that the racks must be moved by a forklift truck or the like. Simply placing wheels on the racks for mobility purposes is simply not possible, as the racks are generally stacked one on another after delivery of the contents of the racks to a user.

It has also been known that shipping racks with wheels may move during transport in a tractor trailer causing damage to the glass sheets being transported.

Accordingly, it is an object of the invention to provide a stackable dolly for transporting one or more shipping racks containing flat sheets, such as flat glass sheets, flat insulating glass sheets, plywood sheets, paneling, gypsum boards and the like.

It is another object of the invention to provide a dolly for transporting flat sheets of relatively long length.

It is another object of the invention to be able to transport flat sheets of relatively long length in a simple and reliable manner.

It is another object of the invention to reduce the risk of shifting of a dolly during transport in a tractor trailer.

Briefly, the invention provides a stackable dolly that is comprised of a rectangular frame with a plurality of wheels mounted on an underside of the frame for rollably supporting the frame on a surface. In addition, the frame is provided with a plurality of posts each of which has an opening in one end and a male member at an opposite end. Each male member is sized for insertion in an opening of a post of a second such dolly for stacking purposes.

A plurality of dollies may be stacked one on another via the posts, that is, by having the male member of one post inserted into the opening of the post of the other dolly.

The posts of the dollies are of a size to support a second dolly with the wheels of that dolly in a suspended manner, i.e. without touching the dolly below. Thus, the wheels of the dolly can be used for mobility purposes for movement of the dolly from place to place. However, when stacked, the wheels of the upper dollies of a stack are suspended in space. Only the bottom-most dolly has wheels that touch a surface for mobility purposes.

The dolly may be of any suitable length to receive one or more shipping racks. For example, a dolly may be sized to receive two shipping racks that, in turn, are used to support flat glass sheets of a length greater than the length of a given rack but of a length equal to the length of a dolly.

Dollies of different lengths may be provided. In this case, the dolly of greater length is provided with a second plurality of posts that are mounted on the frame of the dolly in a rectangular array to receive and support a shorter dolly thereon. In this case, each of the posts for supporting the shorter dolly cooperates with a corner post of a shorter dolly via the male and female connection, that is to say, a pin is provided on one post for fitting within an opening in the opposed post. In addition, in order to provide a more compact structure, each post of the second plurality of posts is mounted at an intermediate point of the rack and is movable from a first position astride the frame for receiving a second dolly thereon and a second position of storage within the vertical plane of the frame. Thus, when the rack is used to stack other dollies, the second plurality of posts are positioned astride the frame for receiving the dolly above. When the rack is used to transport objects such as flat glass, the posts are moved to within the vertical plane of the frame and out of the way.

Each dolly is also provided with a plurality of hollow tubes that are mounted along one or both of the longitudinal sides of the frame for receiving a pair of racks. These racks are removably mounted so as to be separated from the dollies for storage and return purposes.

Each dolly is also provided with a plurality of U-shaped brackets that are disposed in dependent relation from the rectangular frame. These brackets are sized to receive the forks of a forklift for purposes of transporting the dollies from place to place. When placed in use, one or more shipping racks having flat sheets, for example, of glass or insulating glass thereon are placed on a dolly. The thus loaded dolly may then be moved from place to place via the wheels, for example, manually. Each rack also has suitable locking arrangements, such as lockable casters, for locking the wheels against movement.

Each dolly is also provided with a pair of support feet at one end for purposes of supporting that end of the dolly during transport, for example in a tractor trailer. In accordance with the invention, each support foot is removably mounted on an underside of a respective post in order to receive the weight of the frame thereon and to elevate the wheels at that end of the frame above a support surface. For example, when a loaded dolly is placed within a tractor trailer, a fork lift or other lifting device is used to lift the rear end of the dolly so that the support feet may be secured to the underside of the posts at that end of the dolly in order to elevate the wheels at that end. Since the front end of the dolly is typically against a wall or other loaded item within the tractor trailer, there is insufficient room for a fork lift or lifting device to lift the front end of the dolly to apply similar support feet.

Each support foot may also be provided with a non-skid bottom surface to further reduce the risk that a loaded dolly would move within the tractor trailer.

In accordance with the invention, a pin is used to secure a support foot to a post. In addition, a chain is secured to the pin so that when the pin is removed from the support foot, the chain may be used to envelop a component of the frame and the pin inserted into a support foot so that the support foot and pin can be returned with the dolly for reloading purposes.

Once the dolly has been transported to a customer and the rack or racks of flat sheets removed, the dolly may be set aside for reuse or return for a second shipment of flat sheets. Several such dollies may be stacked one upon the other for storage purposes or for return purposes. This enables the empty dollies to be stacked for return, thereby greatly reducing the freight expenses for return shipment.

Since a dolly may be made of a length to receive two or more shipping racks, relatively long lengths of flat sheets may be shipped via the dolly.

These and other objects and advantages of the invention will become more apparent from the following detailed description taken in conjunction with the accompanying drawings, wherein.

Figure 1:
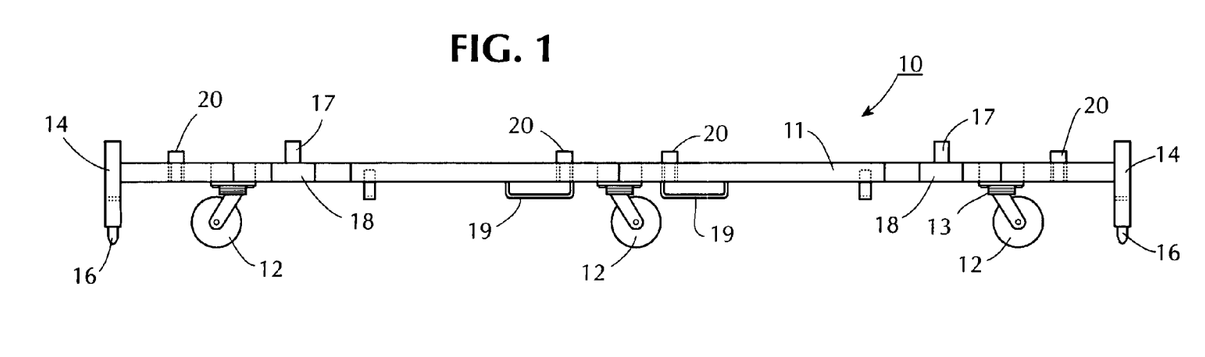
FIG. 1 illustrates a front elevational view of a dolly constructed in accordance with the invention.
Figure 2:
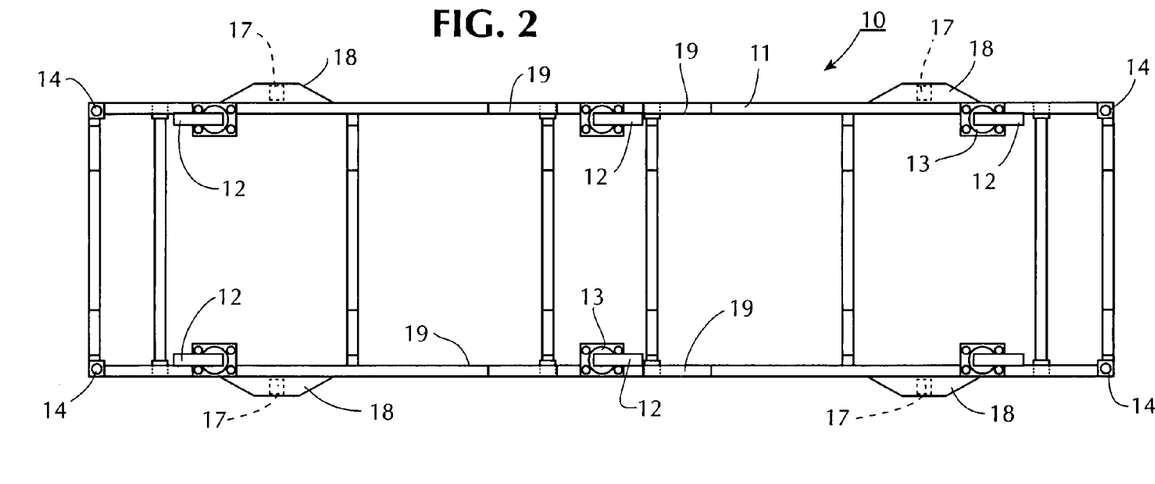
FIG. 2 illustrates a bottom view of the dolly of FIG. 1.

Referring to FIGS. 1 and 2, the dolly 10 includes a rectangular skeletal frame 11 and a plurality of wheels 12 that are mounted on an under-side of the frame 11 for rollably supporting the frame 11 on a surface (not shown). As indicated, three wheels 12 are mounted on suitable supports 13 along each of the two longitudinal sides of the frame 11. For example, each wheel 12 is a swivel caster so as to be pivoted into a proper direction for movement of the dolly 10 from place to place. Also, each wheel 12 may be provided with a brake or locking arrangement (not shown) to secure the wheel 12 against rolling.

The dolly 10 is made of steel or other suitable material to support heavy loads, for example of 6000 pounds or more. The components of the dolly 10 may be welded together or otherwise fabricated to form a skeletal frame 11.

Figure 8:
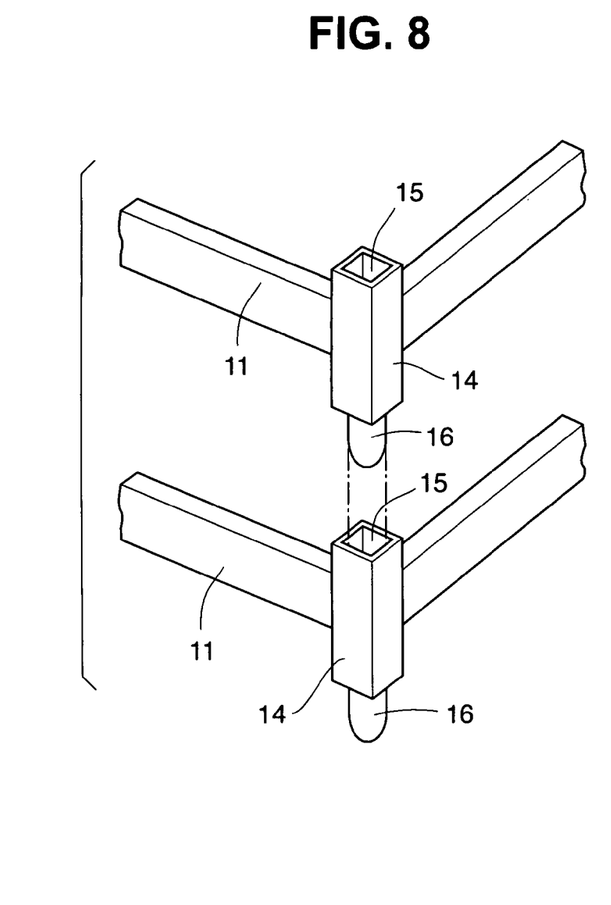
FIG. 8 illustrates a manner of inter-connecting the corner posts of a stack of dollies.

The dolly 10 also includes a plurality of posts 14, each of which is mounted at a respective corner of the frame 11. Alternatively, the posts 14 may be mounted at other locations than the corners of the dolly 10. Referring to FIG. 8, each post 14 is made as a hollow rectangular tube with an opening 15 in one end and a male member 16 at an opposite end. As illustrated, the opening 15 is at the upper end of the post 14 and the male member 16 is at the lower end. However, the positions of the opening 15 and male member 16 may be reversed.

The male member 16 is sized for reception in an opening 15 of a second dolly 10 as further described below.

For ease of fabrication, the male member 16 is in the form of a pin that is circular in cross-section and that tapers at the end. Alternatively, the member 16 may be in the shape of a truncated or wedge-shaped block. By way of example, the pin may be mounted on a rectangular plate that, in turn, is welded or otherwise fixably attached to the bottom of the post 15.

Figure 3:
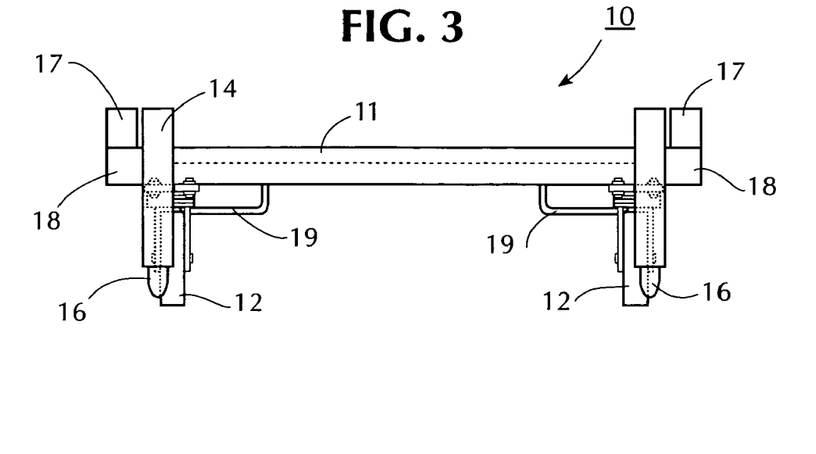
FIG. 3 illustrates an end view of the dolly of FIG. 1.
Figure 6:
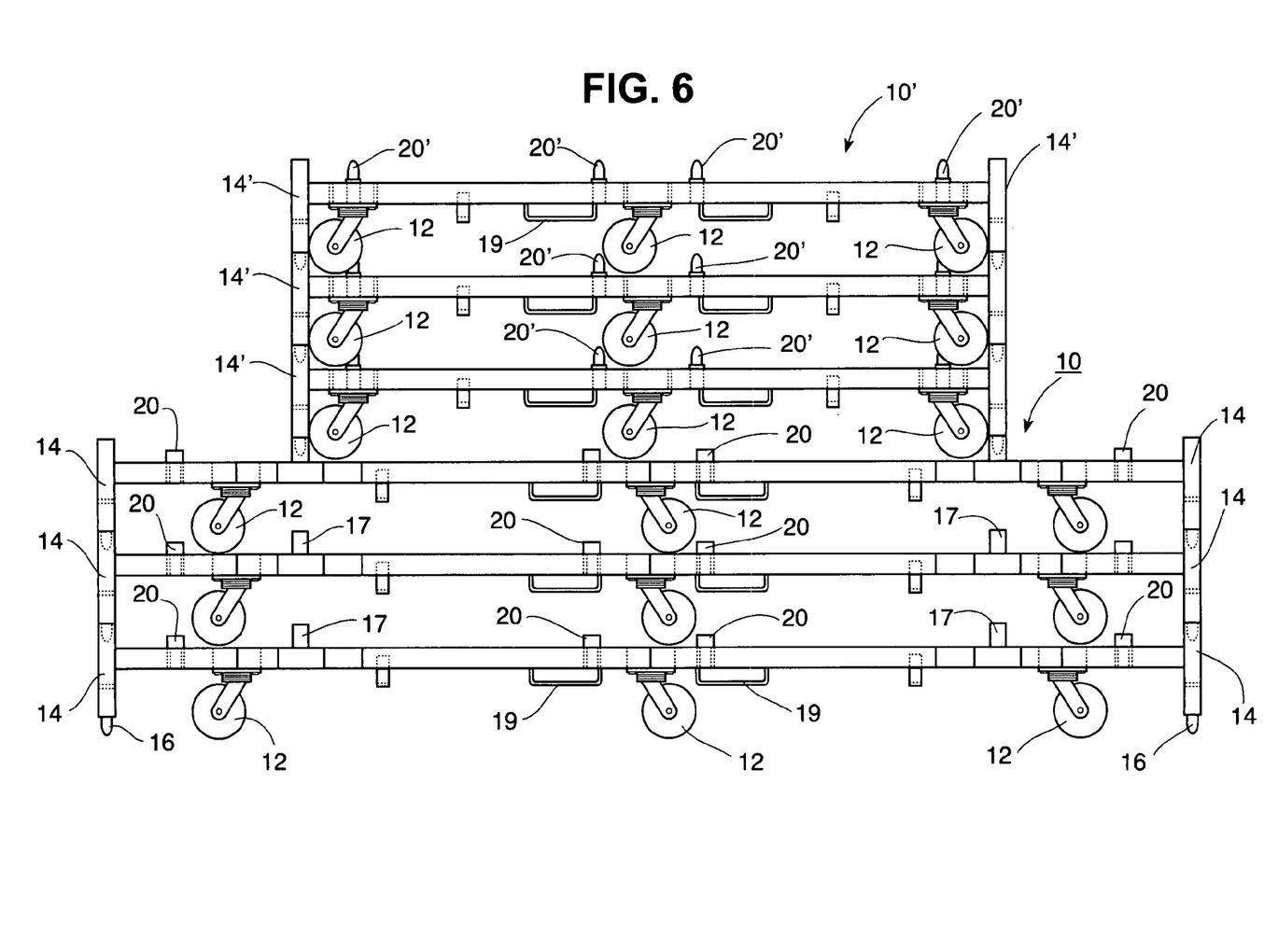
FIG. 6 illustrates a stack of dollies in accordance with the invention.

Referring to FIGS. 1 and 3, the dolly 10 also includes a second plurality of posts 17, i.e., four posts that are mounted in a rectangular array to receive and support a second dolly of shorter length and wider width thereon, for example, as indicated in FIG. 6. Each post 17 is of hollow rectangular construction, for example, having a length and width of 2.50 inches, with an upstanding length of 3.75 inches. Each post 17 is mounted on a bracket 18 that is secured to the outside of the frame 11 (see FIG. 2). The size of the posts 17 may be different from the example with the constraint that the posts are sufficiently high to keep the dolly wheels from touching the dolly below during a stacking event.

The dolly 10 also has a plurality of U-shaped brackets 19 that are disposed in dependent relation from the longitudinal sides and transverse ends of the frame 11 for receiving the forks of a forklift for transportation purposes.

Referring to FIG. 1, the dolly 10 also includes a plurality of hollow tubes 20 (or pins) that are mounted on each of the two longitudinal sides of the frame 11 in an upstanding manner. Each tube 20 is of hollow construction and rectangular shape, for example, being 2.50 inch by 2.50 inch and a height of 2.50 inches from a plane of the frame 11. These tubes 20 are provided to receive a rack 22 (see FIG. 4) as described below. The height, width and location of the tubes 20 (or pins) are critically dependent on the geometry of the racks 22 used for shipping flat sheets.

Figure 4:
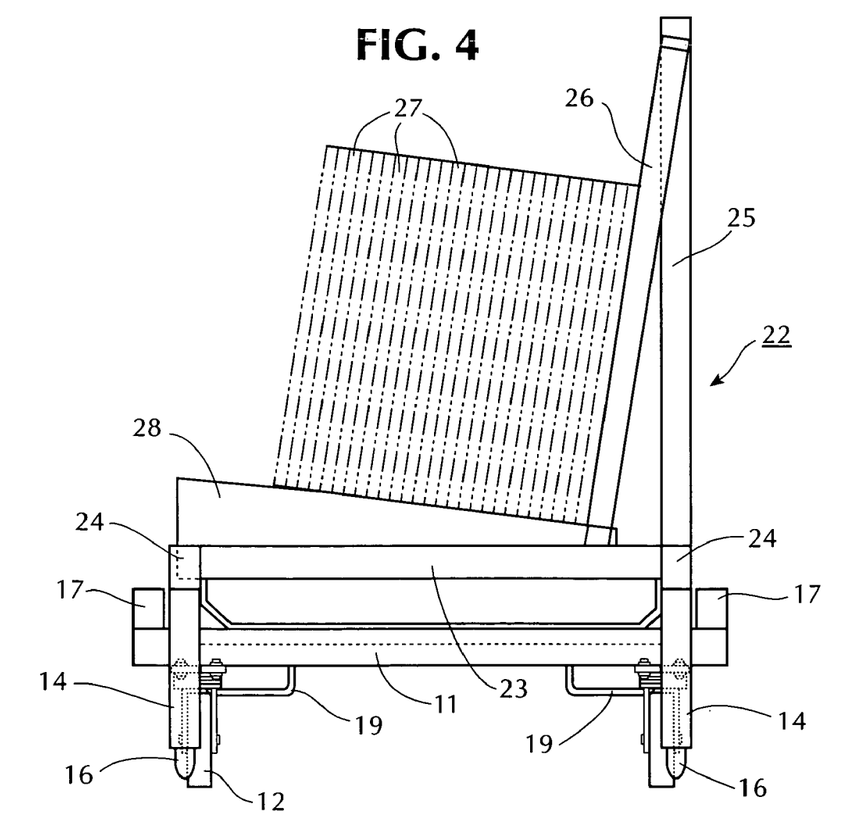
FIG. 4 illustrates an end view of the dolly of FIGS. 1 to 3 loaded with a shipping rack in accordance with the invention.
Figure 5:
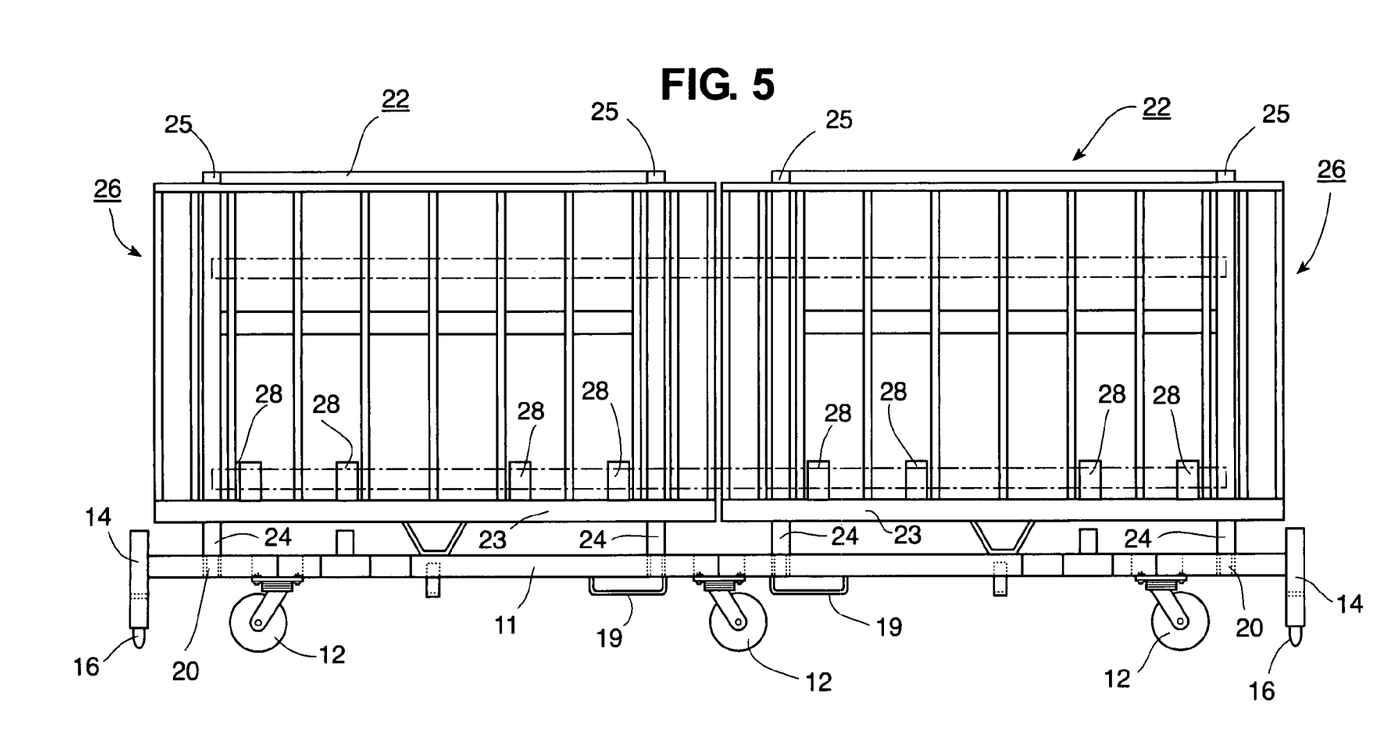
FIG. 5 illustrates the dolly of FIG. 1 with a pair of shipping racks mounted thereon and holding relatively long lengths of flat glass sheets.

Referring to FIGS. 4 and 5, the dolly 10 is of a length to receive two racks 22. By way of example, the rectangular frame has a length of 14 feet and a width of 44 inches. Each wheel 12 has a diameter of 8 inches. Of course, the dimensions of a dolly could change where different sized racks are employed.

Each rack 22 is of conventional structure and has a base 23 of skeletal rectangular shape with four depending legs 24 at the corners. Each leg 24 is of hollow rectangular shape and is sized to fit over a tube 20 (or pin) on a dolly 10 as shown in FIG. 4. The tubes 20 (or pins) on the dolly 10 thus serve to hold each rack 22 in place when mounted on the dolly 10. Typically, flat sheets of cardboard or the like (not shown) are placed on the base 23 as well as the upright back of the base 23 to provide a flat surface for loading purposes.

Each rack 22 also has a pair of vertical posts 25 that are secured as by welding to the base 23 as well as a skeletal back wall 26 that is secured between and to the base 23 and posts 25 as by welding. The back wall 26 is inclined relative to the horizontally disposed base 23 so that a plurality of flat glass sheets or flat insulated glass units 27 may rest thereon in an inclined manner.

Each rack 22 carries a plurality of wedges 28 on the base 23 to support the glass sheets or insulating glass units 27 in parallel manner. In this regard, the upper surfaces of the wedges 28 define a plane at a right angle to the plane of the back wall 26. Each wedge 28 may be made of corrugated cardboard or other suitable material.

Referring to FIG. 5, the flat sheets of glass or glass insulating units 27 are of a length to extend across the two racks 22. That is to say, the sheets of flat glass or insulating units 27 are greater in length than a single rack 22 and are substantially the same length as the dolly 10.

Figure 7:
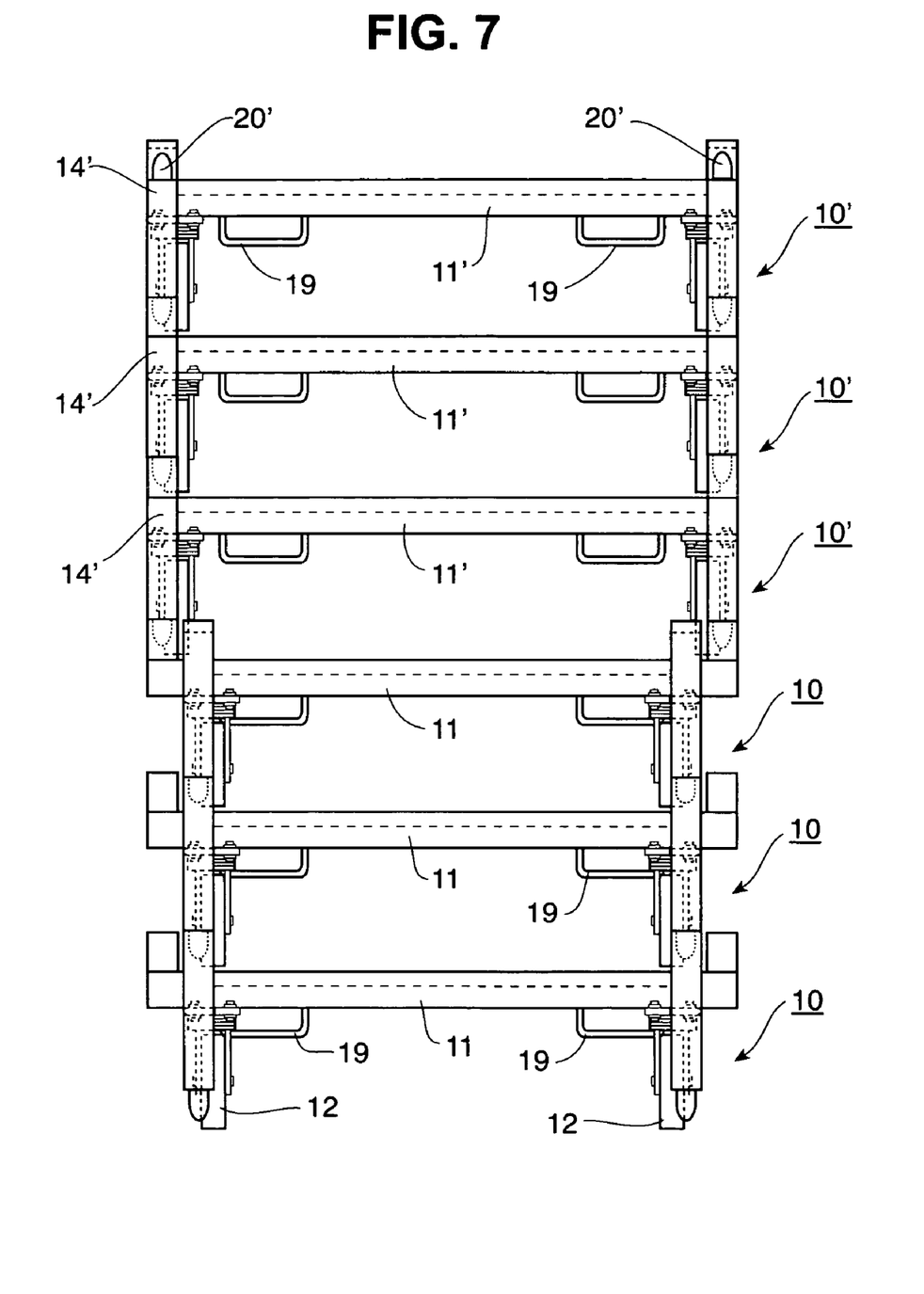
FIG. 7 illustrates an end view of the stack of dollies of FIG. 6.

Referring to FIGS. 6 and 7, wherein like reference characters indicate like parts as above, a smaller dolly 10' is constructed in similar manner to the longer dolly 10 in order to accommodate racks of a different geometry that are to be placed on the dolly 10'. However, the shorter dolly 10' is of a wider width than the longer dolly 10, as indicated in FIG. 7. For example, the shorter dolly 10' has a length of 109 inches and a width of 50 inches.

Figure 9:
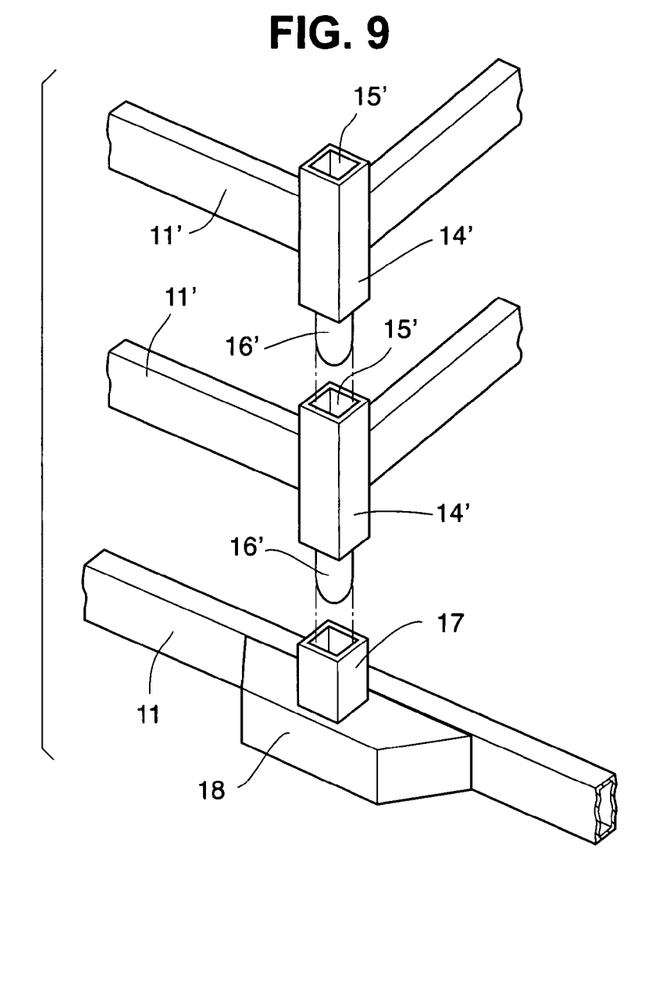
FIG. 9 illustrates a manner of inter-connecting a dolly of short lengths on a dolly of longer length in accordance with the invention.

When a shorter dolly 10' is mounted on a longer dolly 10, the corner posts 14' of the shorter dolly 10' are mounted on the laterally disposed posts 17 of the longer dolly 10, as indicated in FIG. 9. That is to say, the pin 16' of the post 14' of a shorter dolly 14 fits into the hollow post 17 on the longer dolly 10.

As indicated in FIG. 6, a stack of dollies 10, 10' may consist of three longer dollies 10 and three shorter dollies 10' to a height of 86 inches. However, a stack of dollies may be made up of any combination of long and short dollies and may be of any suitable height.

Each dolly 10, 10' is constructed so that the wheels 12 are disposed to rest on a common horizontal plane and each pin 16 is sized to terminate in a horizontal plane disposed above the common horizontal plane on which the wheels rest. Thus, the dependent pins 16 do not interfere with the mobility of the dolly 10, 10'.

The dollies 10, 10' are constructed so that when stacked, the corner posts 14 of the upper dolly 10, 10' are supported directly on the posts 14 of the dolly below and the wheels 12 of the dolly 10 above are suspended without touching any surface. In this way, when the dollies 10, 10' are stacked, the wheels 12 are free to rotate in space without contacting any surface, except for the bottom-most dolly 10 whose wheels 12 are used for mobility purposes whether as an individual dolly or as the base dolly of a stack of dollies without racks thereon.

Referring to FIGS. 4 and 5, once the racks 22 and the flat glass sheets or insulating units 27 have been unloaded, the dolly 10 may then be stacked on other like dollies, as indicated in FIG. 6.

Figure 10:
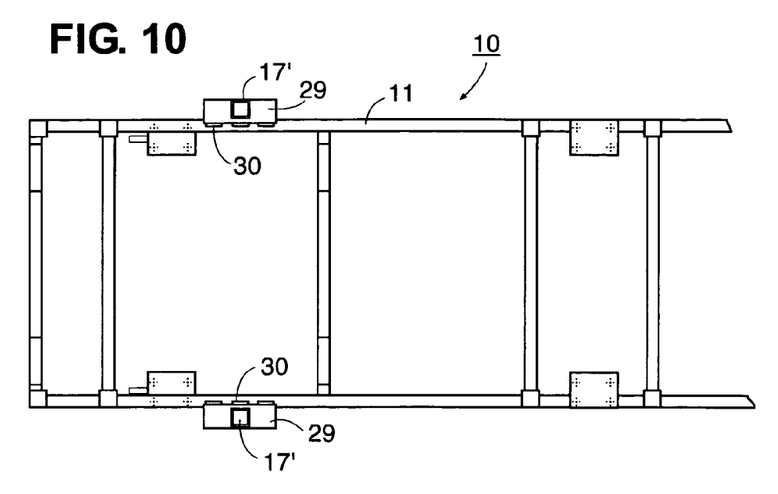
FIG. 10 illustrates a partial view of a rack having movable posts for the stacking of a shorter dolly upon the rack in accordance with the invention.
Figure 11:
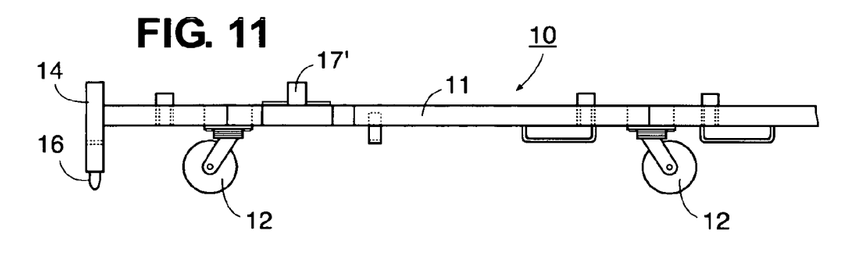
FIG. 11 illustrates a partial front elevational view of the modified dolly of FIG. 10.
Figure 12:
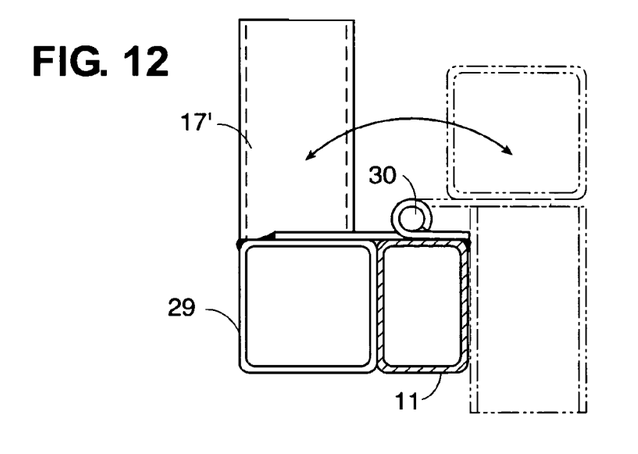
FIG. 12 illustrates a post that is movable from a first position illustrated in solid line for receiving a dolly and a second position illustrated in dotted line within the frame of a rack for transportation of product in accordance with the invention.

Referring to FIGS. 10 to 12, wherein like reference characters indicate like parts as above, the dolly 10 may be modified with posts 17' that are movable from a first position, as shown, astride the frame 11 for receiving a shorter dolly thereon, for example in a manner as illustrated in FIG. 6, and a second position as shown in dotted line in FIG. 12 within the vertical plane of the frame 11.

Referring to FIG. 12, each post 17' is secured in perpendicular relation to a hollow tube 29, for example, by welding. The tube 29 is, in turn, secured to a hinge 30 that is mounted on the frame 11 so as to be pivoted 180° from the solid line position illustrated in FIG. 12 to the dotted line position as illustrated.

When the post 17' is in the solid line position, the post 17' is used for shipping stacked dollies. When the post 17' is rotated 180° to the closed dotted line position, the post 17' is in a storage position for the shipping of products, such as glass sheets on the rack 10. As illustrated, the hollow tube 29 rests against the side wall of the frame 11 when in the opened solid line position while the post 17' rests against the side wall of the frame 11 when in the closed storage position for the shipping of product. In this latter position, the post 17' does not project from the plane of the frame 11. The rack 10 does not have any projections that might impact against other racks or structures.

Figure 13:
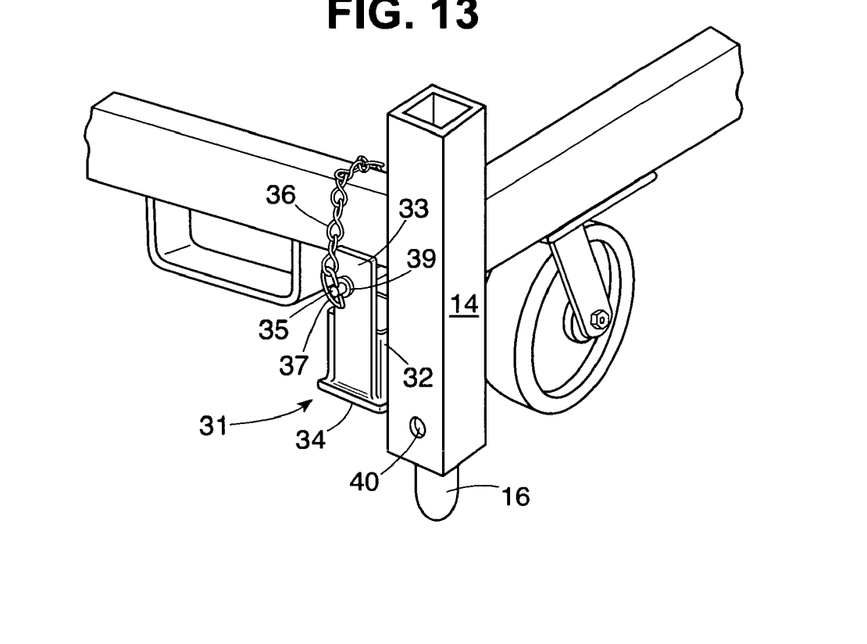
FIG. 13 illustrates a perspective view of a support foot mounted on a dolly in a storage position.
Figure 14:
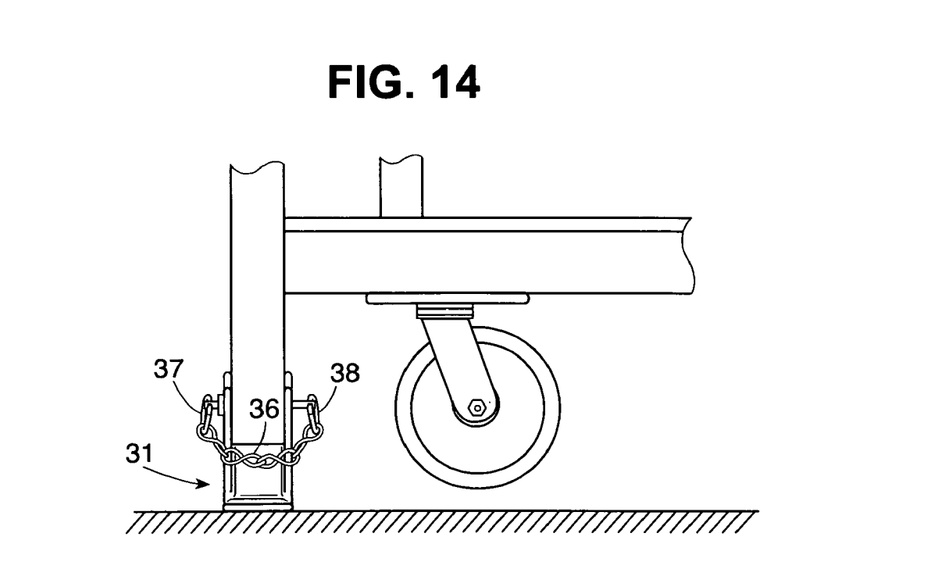
FIG. 14 illustrates a view of a support foot mounted on a post at the rear end of a dolly in accordance with the invention.

Referring to FIGS. 13 and 14, the dolly 10 is also provided with a pair of support feet 31 (only one of which is shown) at one end of the frame 11.

Referring to FIG. 13, each support foot 31 is formed of a rectangular metal tube 32, a pair of upstanding ears or plates 33 that are secured as by welding to two opposite sides of the tube 32 and a plate 34 that is secured as by welding across the bottom of the tube 32 to form the bottom of the support foot 31.

The tube 32 is sized to abut up against the bottom of a post 14 of the frame 11 as indicated in FIG. 14 while receiving the depending pin 16. The upstanding ears 33 are sized to slidably receive the post 14 therebetween.

The bottom plate 34 of each foot 31 is provided with a non-skid bottom surface, for example formed by a plurality of parallel serrations (not shown). For example, each serration may be formed by a weld bead having a height of ⅛ inch and a width of ¼ inch. Further, these serrations are disposed in perpendicular relation to the longitudinal length of the dolly 10 and serve to bite into a surface on which the dolly 10 is mounted should the dolly 10 be moved at that end.

Referring to FIG. 13, a locking pin 35 passes through suitable holes (not shown) in the ears 33 of the foot support 31 and is fixedly secured at one end to a chain 36 as by a clip 37. The opposite end of the chain 36 is removably secured as by a clevis pin 38 (see FIG. 14) to the opposite end of the pin. The chain 36 is of a length so as to envelop a component of the frame 11 to thereby carry the support foot 31 on the frame 11 when the foot 31 is not in use.

The locking pin 35 has a fixed collar 39 to abut against the outside of an ear 33 to prevent further passage through the hole (not shown) in that ear 33.

As illustrated in FIG. 13, the post 14 that is to receive the support foot 31 is provided with holes 40 on opposite sides for receiving the locking pin 35.

Referring to FIG. 14, after a dolly 10 has been loaded front end first into a carrier, such as a tractor railer, the chains 36 holding each of the support feet 31 on the frame 11 are opened and the support feet 31 are removed from the frame 11. The rear end of the dolly 10 is then lifted by a suitable device, such as a fork lift or other lifting device.

Next, the locking pin 35 is withdrawn from a support foot 31, if not previously removed, and the support foot 31 fitted to the underside of a post 14 at that end of the dolly 10. At this time, the support foot 31 receives the depending member 16 of the post 14 and the ears 33 are slid over the sides of a post 14. The locking pin 35 is then passed through the aligned holes in the ears 33 and the post 14 to secure the support foot 31 to the post 14. The clevis pin 38 on the free end of the chain 36 is then reclipped to the end of the pin 35 to maintain the pin 35 in place. The second support foot 31 is secured to the underside of the other post 14 at that end of the dolly 10 in like manner.

When the support feet 31 are mounted on the underside of the posts 14, the wheels 12 at that end of the dolly 10 are elevated above the support surface e.g. approximately ⅜ inch off the support surface (See FIG. 14). Thus, should a force be imposed upon the loaded dolly 10 during transport, for example a force tending to move the loaded dolly in a transport vehicle such as a tractor trailer, the flat support surfaces provided by the bottom plates 34 of the support feet 31 will resist the force. This resistance to movement will be further enhanced by the non-skid bottom surface of each foot 31. The use of serrations on the bottom of the support feet will enhance the ability of the support feet to "bite into" the floor of a transport vehicle to prevent movement.

When a loaded dolly 10 is to be removed from the transport vehicle, the rear end of the dolly 10 is again raised by a fork lift or other device so that the support feet 31 can each be removed from the underside of the posts 14. At this time, the chains 36 are again employed to mount each support foot 31 on a component of the frame 11 so that each support foot 31 can be hung from the component as illustrated in FIG. 13 for return purposes.

The invention thus provides a dolly that can transport relatively heavy loads in an easy and reliable manner. In particular, the invention provides a dolly which is capable of transporting relatively long lengths of flat sheets, for example of glass, plasterboard, plywood, paneling, sheet metal, sheet rock, Plexiglas and plastic sheet materials, cardboard sheets and the like as well as insulating glass units, stone, granite, marble and the like.

Further, the invention provides dollies which can be stacked one upon another for ease of storage and return to a manufacturer of flat product or the like.

The invention further provides a dolly that can be used to transport other materials, particularly flat glass sheets and insulating glass units in a reliable manner.

What is claimed is:

1. A stackable doily comprising
a rectangular frame;
a plurality of wheels mounted on an underside of said frame for rollably supporting said frame on a surface;
a first plurality of posts mounted on said frame, each said post having an opening in one end thereof and a male member at an opposite end thereof, each said member being sized for reception in an opening of a post of a second such dolly; and
a second plurality of posts mounted on said frame in a rectangular array to receive and support a second dolly thereon, each post of said second plurality of posts being movable from a first position astride said frame for receiving a second doily thereon and a second position within the vertical plane of said frame.

2. A stackable dolly as set forth in claim 1 wherein said male member is a pin.

3. A stackable dolly as set forth in claim 2 wherein said pin is disposed on an underside of said respective post and said opening is in an upper end of said respective post.

4. A stackable dolly as set forth in claim 2 wherein said pin is circular in cross section.

5. A stackable dolly as set forth in claim 1 wherein said wheels are disposed to rest on a common horizontal plane and each said pin terminates in a horizontal plane disposed above said common horizontal plane.

6. A stackable dolly comprising
a rectangular frame;
a plurality of wheels mounted on an underside of said frame for rollably supporting said frame on a surface;
a plurality of posts mounted on said frame, each said post having an opening in one end thereof and a male member at an opposite end thereof, each said member being sized for reception in an opening of a post of a second such dolly;
at least two support feet carried on one end of said frame, each said support foot being movable under said frame to receive the weight of said frame thereon and to elevate said wheels above the support surface, each said support foot being removably mounted on an underside of a respective post; and
a locking pin passing transversely through a respective support foot and a respective post to removably secure said respective support foot to said respective post.

7. A stackable dolly comprising
a skeletal rectangular frame;
a plurality of wheels mounted on an underside of said frame for rollably supporting said frame on a surface;
a plurality of posts, each said post being mounted on said frame and having an opening in an upper end thereof;
a plurality of pins, each said pin being disposed at a lower end of a respective post and being sized for reception in an opening of a post of a second dolly; and
a second plurality of posts of hollow construction mounted on said frame in an upstanding rectangular array to receive and support a second dolly thereon, each said post of said second plurality of posts being disposed at an intermediate point of said frame spaced from a respective corner of said frame.

8. A stackable dolly as set forth in claim 7 wherein said wheels are disposed to rest on a common horizontal plane and each said pin terminates in a horizontal plane disposed above said common horizontal plane.

9. A stackable dolly as set forth in claim 7 wherein each pin is tapered.

10. A stackable dolly as set forth in claim 7 wherein each post of said second plurality of posts is movable from a first position astride said frame for receiving a second dolly thereon and a second position within the vertical plane of said frame.

11. A stackable dolly comprising
a skeletal rectangular frame;
a plurality of wheels mounted on an underside of said frame for rollably supporting said frame on a surface;
a plurality of posts, each said post being mounted on said frame and having an opening in an upper end thereof;
a plurality of pins, each said pin being disposed at a lower end of a respective post and being sized for reception in an opening of a post of a second dolly; and
a plurality of hollow tubes mounted on each of two longitudinal sides of said frame in upstanding relation and intermediately of said posts for removably receiving a rack thereon.

12. A stackable dolly as set forth in claim 7 which further comprises a plurality of U-shaped brackets disposed in depending relation from said frame for receiving forks of a forklift.

13. A stack of dollies comprising
at least one dolly of a predetermined length, said dolly having a skeletal rectangular frame, a plurality of wheels mounted on an underside of said frame for rollably supporting said frame on a surface, a plurality of posts, each said post being mounted at a respective corner of said frame and having an opening in an upper end thereof, and a plurality of pins, each said pin being disposed at a lower end of a respective post;
at least a second dolly of a length equal to said predetermined length mounted on said one dolly, said second dolly having a skeletal rectangular frame, a plurality of wheels mounted on an underside of said frame for rollably supporting said frame on a surface and spaced from said one dolly, a first plurality of posts, each said post being mounted at a respective corner of said frame of said second dolly and supported on a respective post of said one dolly, a plurality of pins, each said pin being disposed at a lower end of a respective post of said second dolly and being received in an opening of a respective post of said one dolly, and a second plurality of posts of hollow construction mounted on said frame thereof in an upstanding rectangular array, each said post of said second plurality of posts being disposed at an intermediate point of said frame spaced from a respective corner of said frame; and
a third dolly of a length less than said predetermined length mounted on said second dolly, said third dolly having a skeletal rectangular frame, a plurality of wheels mounted on an underside of said frame for rollably supporting said frame and spaced from said second dolly, a plurality of posts, each said post being mounted at a respective corner of said frame of said third dolly and supported on a respective post of said second plurality of posts of said second dolly, and a plurality of pins, each said pin being disposed at a lower end of a respective post of said third dolly and being received in an opening of a respective post of said second plurality of posts of said second dolly.

14. A stackable dolly comprising
a rectangular frame;

a plurality of wheels mounted on an underside of said frame for rollably supporting said frame on a support surface;

a plurality of posts mounted on said frame, each said post having a lower end disposed in horizontal plane disposed within a plane of said wheels and in spaced relation to the support surface;

at least two support feet carried on one end of said frame, each said support foot being removably mounted on an underside of a respective post to receive the weight of said frame thereon and to elevate said wheels above the support surface; and a removably mounted pin passing transversely through a respective support foot and a respective post to secure said respective support foot to said respective post.

15. A stackable dolly as set forth in claim 14 wherein each said support foot has a non-skid bottom surface.

16. A stackable dolly as set forth in claim 15 wherein said non-skid bottom surface includes a plurality of parallel serrations.

17. A stackable dolly as set forth in claim 14 further comprising a chain fixedly secured to said pin at one end thereof and removably secured to said pin at an opposite end thereof, said chain being of a length to envelope a component of said frame for transport therewith with said pin removed from a respective post.

18. A stackable dolly comprising
a rectangular frame;

a plurality of wheels mounted on an underside of said frame for rollably supporting said frame on a surface; and a first plurality of posts mounted on said frame, each said post being disposed at a corner of said frame and having an opening in one end thereof and a male member at an opposite end thereof, each said member being sized for reception in an opening of a post of a second such dolly; and a second plurality of posts of hollow construction mounted on said frame in an upstanding rectangular array to receive and support a second dolly thereon, each said post of said second plurality of posts being disposed at an intermediate point of said frame spaced from a respective corner of said frame.

* * * * *